US007765418B2

(12) United States Patent
Mann et al.

(10) Patent No.: US 7,765,418 B2
(45) Date of Patent: Jul. 27, 2010

(54) MULTI-MODE VOLTAGE SUPPLY CIRCUIT

(75) Inventors: Stephen Mann, Durham, NC (US); Robert Ross, Raleigh, NC (US); Iman Taha, Cary, NC (US)

(73) Assignee: Qimonda North America Corp., Durham, NC (US)

( * ) Notice: Subject to any disclaimer, the term of this patent is extended or adjusted under 35 U.S.C. 154(b) by 644 days.

(21) Appl. No.: 11/686,450

(22) Filed: Mar. 15, 2007

(65) Prior Publication Data

US 2008/0231242 A1 Sep. 25, 2008

(51) Int. Cl.
*H04B 1/38* (2006.01)

(52) U.S. Cl. ....................... 713/320; 713/340; 375/219; 375/226; 375/356; 375/376

(58) Field of Classification Search ................. 713/320, 713/340; 375/219, 226, 356, 376
See application file for complete search history.

(56) References Cited

U.S. PATENT DOCUMENTS 5,373,227 A * 12/1994 Keeth ......................... 323/313
5,530,398 A 6/1996 Shamlou et al.
5,532,576 A 7/1996 MacRobbie et al.
6,005,819 A 12/1999 Shin
6,768,649 B2 7/2004 Dallavalle
7,313,176 B1 * 12/2007 Groen ........................ 375/219
7,333,624 B2 * 2/2008 Husung ...................... 381/312
2002/0022402 A1 2/2002 Dallavalle
2006/0158909 A1 * 7/2006 Hawley ................... 363/21.12

OTHER PUBLICATIONS

Linear Technology. "1.5MHz, 600 mA Synchronous Step-Down Regulator with Bypass Transistor." Specification Sheet for LTC3408.
.
Holtek. "CMOS Switched- Capacitor voltage Converter." Specification Sheet for HT7660, Jan. 21, 2003.

* cited by examiner

*Primary Examiner*—Abdelmoniem Elamin
(74) *Attorney, Agent, or Firm*—Coats & Bennett, P.L.L.C.

(57) ABSTRACT

A supply voltage is provided in an integrated circuit by retrieving an indicator from a storage device and generating a supply voltage for use by the integrated circuit, the supply voltage being regulated responsive to the indicator being in a first state and unregulated responsive to the indicator being in a second state. Alternatively or additionally, an external voltage provided to the integrated circuit is compared with a threshold. The supply voltage is regulated responsive to the external voltage exceeding the threshold level and unregulated responsive to the external voltage falling below the threshold level.

28 Claims, 6 Drawing Sheets

MULTI-MODE VOLTAGE SUPPLY CIRCUIT

BACKGROUND OF THE INVENTION

Integrated Circuits (ICs) such as memory devices, microprocessors, digital signal processors, application-specific ICs and the like conventionally include one or more voltage regulators for maintaining an internal supply voltage at a constant level despite changing load current conditions within an IC. The regulated supply voltage powers circuitry downstream of the regulator. Powering circuitry with a constant supply voltage enables stable and reliable circuit operation.

A conventional voltage regulator has a closed loop amplifier stage that compares the supply voltage output by the regulator to a reference voltage. Any difference between the two voltages is amplified and used to adjust regulator operation. If the regulated supply voltage decreases, e.g., due to increasing current load, the amplifier stage causes an output stage of the regulator to increase its output voltage. Conversely, if the regulated supply voltage increases, e.g., due to decreasing current load, the regulator output stage decreases its output voltage. As such, the closed loop amplifier stage maintains the regulated supply voltage at approximately a constant voltage level.

However, the closed loop amplifier stage of a voltage regulator produces an inherent voltage drop. The voltage drop is reflected in the amplifier output. That is, the amplifier output is slightly reduced due to the inherent voltage drop. The voltage drop carries through to the output stage of the regulator, thus causing a slight voltage reduction in the regulated voltage output.

Regulator-induced voltage drop may adversely affect downstream circuit operation. For example, circuit performance is degraded when the regulated voltage supplying the circuit falls below a critical level, the critical level being the voltage at which the circuit begins to behave unexpectedly or unreliably. Circuit operation is unaffected by a reduction in supply voltage so long as the supply voltage remains above the critical level. However, for low voltage applications, regulator-induced voltage drop may cause the regulated supply voltage to drop below the critical level, causing undesired circuit operation. As such, IC performance is hindered during low voltage operation by powering internal circuitry with a regulated supply voltage.

SUMMARY OF THE INVENTION

According to the methods and apparatus taught herein, a supply voltage is provided in an integrated circuit by retrieving an indicator from a storage device and generating a supply voltage for use by the integrated circuit, the supply voltage being regulated responsive to the indicator being in a first state and unregulated responsive to the indicator being in a second state. Alternatively or additionally, an external voltage provided to the integrated circuit is compared with a threshold. The supply voltage is regulated responsive to the external voltage exceeding the threshold level and unregulated responsive to the external voltage falling below the threshold level.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
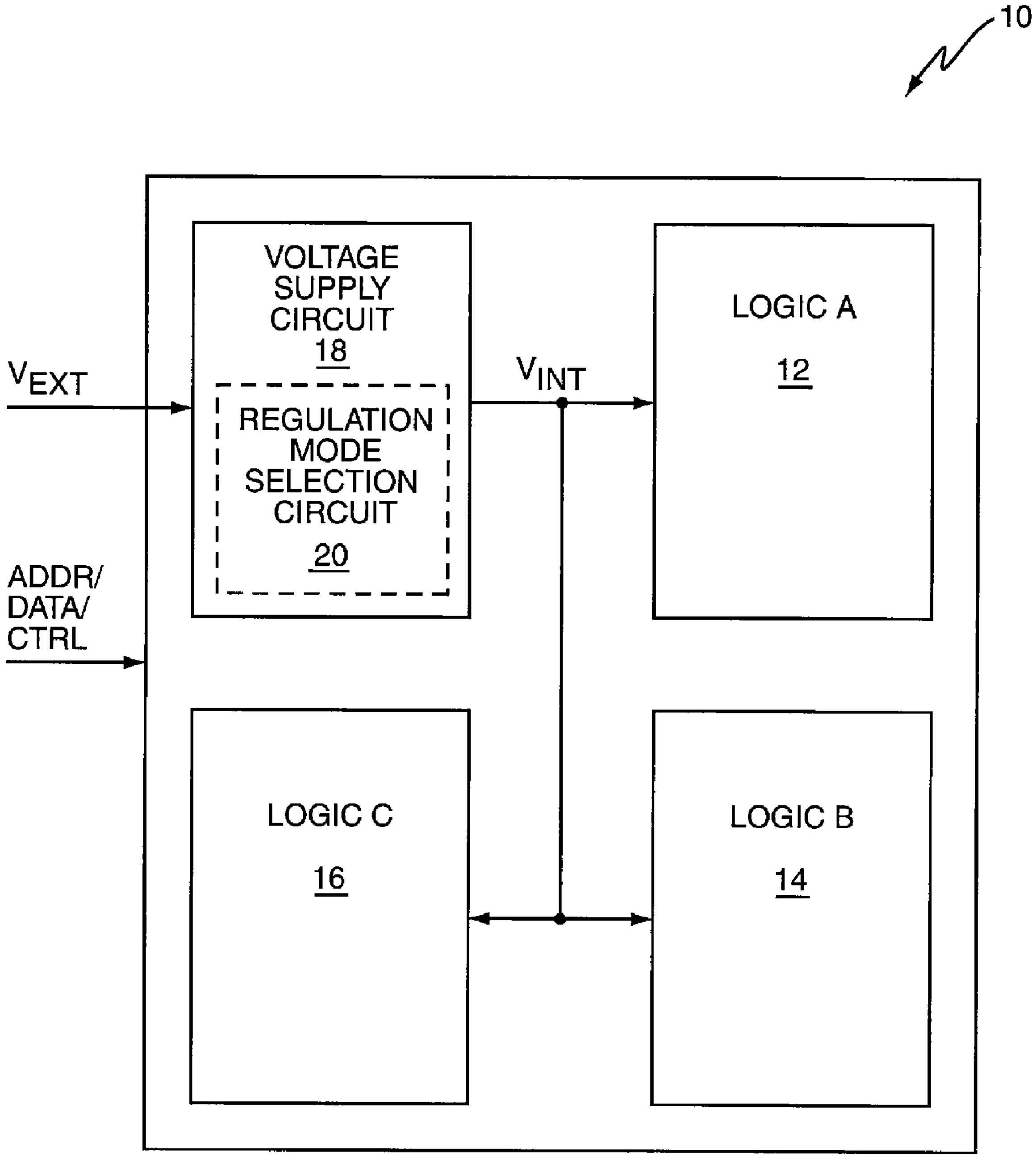
FIG. 1 is a block diagram of one embodiment of an integrated circuit including a voltage supply circuit.

FIG. 1 illustrates an embodiment of an Integrated Circuit (IC) 10 including various logic circuits 12-16 and a voltage supply circuit 18 for providing an internal supply voltage ($V_{INT}$) to the logic circuits 12-16. The term "integrated circuit" as used herein should be interpreted broadly to include any kind of analog or digital electronic circuit such as memory devices (DRAM, SRAM, MRAM, Flash, embedded memory, etc.), microprocessors, microcontrollers, digital signal processors, application-specific ICs, field-programmable gate arrays, system-on-chips, etc. For illustrative purposes only, the IC 10 may comprise a DRAM device and each logic circuit 12-16 is a bank of DRAM cells. In another purely illustrative example, the IC 10 may comprise a microprocessor and the logic circuits 12-16 are processor functional units such as a load/store unit, instruction unit, memory management unit, bus interface unit, caches, etc.

The circuits 12-16 included in the IC 10 provide either predefined or programmable functionality, thus enabling the IC 10 to support one or more applications. The circuits 12-16 are powered by the internal supply voltage provided by the voltage supply circuit 18. A regulation mode selection circuit 20 included in or associated with the supply circuit 18 determines whether the internal supply voltage is to be regulated or not. The internal supply voltage is regulated during normal operation and not regulated during low voltage operation. That is, when the IC 10 operates at a nominal voltage, its internal supply voltage is regulated. Conversely, the regulated internal supply voltage is supplanted with an unregulated supply voltage when the IC 10 operates at a low voltage. When the internal supply voltage is unregulated, it is not subjected to the inherent voltage drop associated with conventional voltage regulators. As such, voltage drop at the output of the supply circuit 18 is reduced. Reduced voltage drop at the supply circuit output increases the low voltage range of the internal supply voltage. Low voltage performance of the IC 10 is improved by powering its internal circuits 12-16 with an unregulated supply voltage having an improved low voltage range since the circuits 12-16 are less likely to malfunction due to an insufficient supply voltage. The terms 'nominal voltage' and 'low voltage' as used herein depend upon the technology used to fabricate the IC 10, and thus, no particular voltage level corresponds to 'nominal voltage' or 'low voltage.' Instead, nominal and low voltage levels vary from technology to technology.

In more detail, the IC 10 is provided an external supply voltage ($V_{EXT}$). The external supply voltage at least partly powers the voltage supply circuit 18. Under nominal operating voltage conditions, the voltage supply circuit 18 regulates the internal supply voltage, the regulated internal supply voltage being proportional to the external supply voltage. Although the internal supply voltage is subjected to regulator-induced voltage drop when regulated, the corresponding reduction in the internal supply voltage is not great enough to cause unexpected circuit behavior when the IC 10 operates at nominal voltage levels. Correspondingly, the circuits 12-16 included in the IC 10 function properly when powered with a supply voltage regulated at a nominal voltage.

During low voltage operation, the mode selection circuit 20 disables voltage regulation. Thus, the circuits 12-16 included in the IC 10 are powered by an unregulated supply voltage. Although the internal supply voltage is not regulated during low voltage operation, its low voltage range is improved by avoiding regulator-induced voltage drop. The voltage range improvement gained by not regulating the internal supply voltage enables the circuits 12-16 to function properly when the IC 10 operates at low voltage levels. The mode selection circuit 20 thus ensures that the circuits 12-16 included in the IC 10 are provided a sufficient supply voltage regardless of whether the IC 10 is operating in a low voltage or nominal voltage mode.

Figure 2:
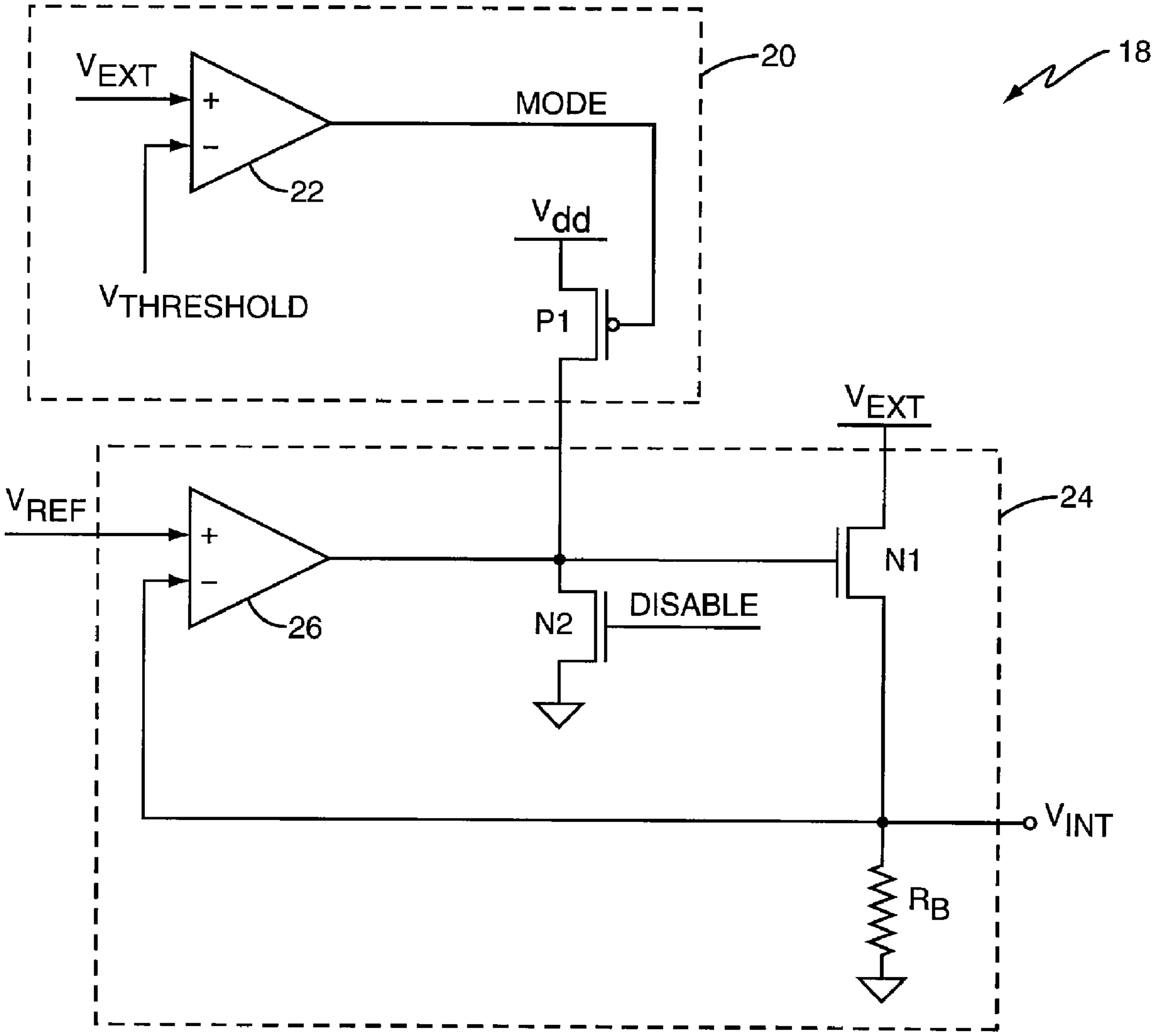
FIG. 2 is a block diagram of one embodiment of the voltage supply circuit of FIG. 1.
Figure 3:
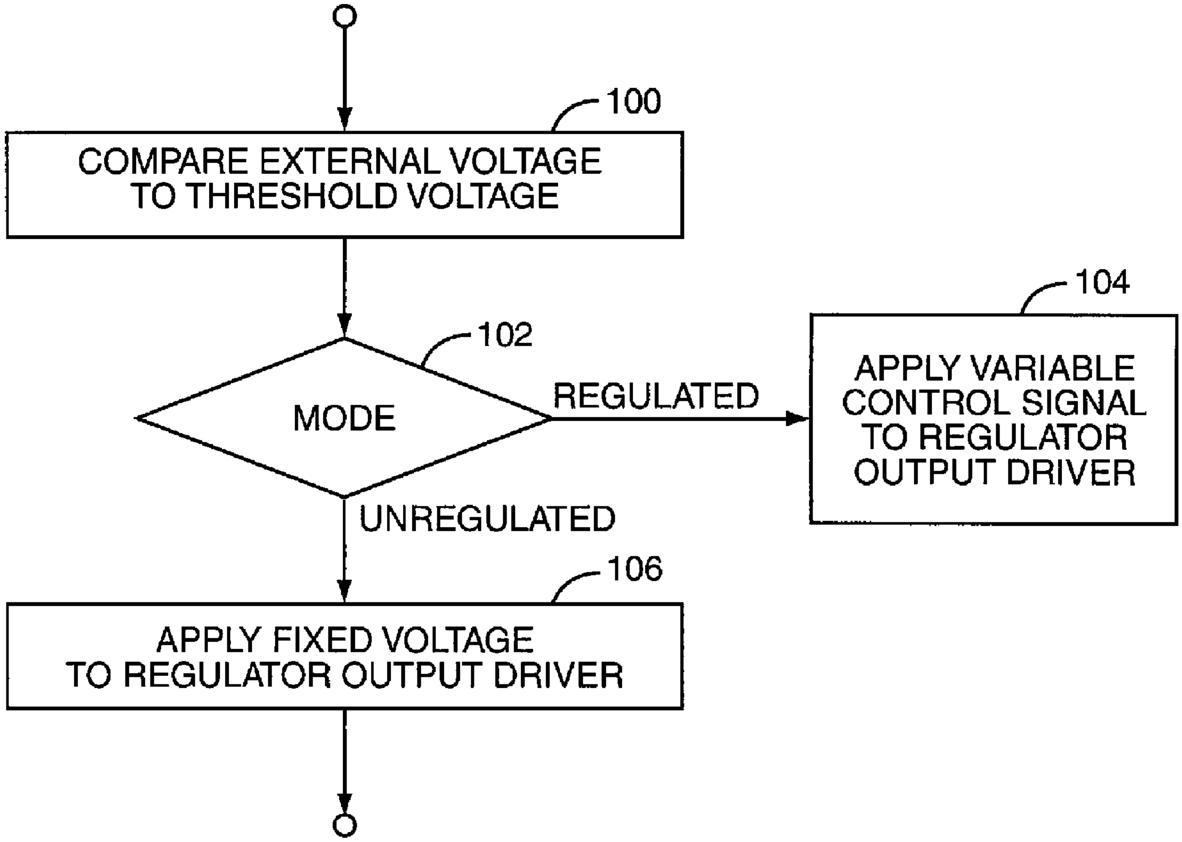
FIG. 3 is a logic flow diagram of one embodiment of program logic for providing an internal supply voltage to circuitry included in the integrated circuit of FIG. 1.

FIG. 2 illustrates one embodiment of the voltage supply circuit 18. According to this embodiment, voltage regulation decisions are based on comparing the external supply voltage ($V_{EXT}$) provided to the IC 10 with a threshold level ($V_{THRESHOLD}$), as illustrated by Step 100 of FIG. 3. The difference between the threshold level, which may be fixed or programmable, and the external supply voltage determines whether the internal supply voltage ($V_{INT}$) is regulated, as illustrated by Step 102 of FIG. 3. If the external supply voltage exceeds (or equals) the threshold, the mode selection circuit 20 enables regulation of the internal supply voltage, as illustrated by Step 104 of FIG. 3. Otherwise, the internal supply voltage is not regulated, as illustrated by Step 106 of FIG. 3.

In more detail, the mode selection circuit 20 comprises a comparator 22 and a bypass device such as p-FET transistor P1. The comparator 22 determines whether the external supply voltage exceeds (or equals) the threshold. If so, a signal output by the comparator (MODE) disables transistor P1. Otherwise, transistor P1 is enabled. When transistor P1 is disabled, a voltage regulator 24 included in or associated with the supply circuit 18 regulates the internal supply voltage. Conversely, voltage regulation is disabled when transistor P1 is enabled as will be described in detail later.

The internal supply voltage is regulated by applying a variable control signal to an output driver stage such as n-FET transistor N1 of the regulator 24. The magnitude of the variable control signal determines how strongly (or weakly) the gate of transistor N1 is turned on. The more strongly transistor N1 is turned on, the larger the voltage output by transistor N1. Conversely, the voltage output by transistor N1 decreases as the bias applied to the gate of transistor N1 is decreased.

The magnitude of the variable control signal applied to the gate of transistor N1 is determined by an amplifier 26 included in the voltage regulator 24. A reference voltage ($V_{REF}$), e.g., a bandgap reference, is applied to one input of the amplifier 26 while the internal supply voltage is fed back to the other amplifier input. The feedback loop enables the regulator 24 to maintain the internal supply voltage approximately equal to the reference voltage. The amplifier 26 outputs a control signal having a magnitude corresponding to the difference between the reference and feedback voltages. The variable control signal causes transistor N1 to sink enough current through bias resistor $R_B$ to maintain the internal supply voltage approximately equal to the reference voltage, thus regulating the internal supply voltage.

However, the variable control signal output by the amplifier 26 is subjected to the inherent voltage drop associated with the amplifier 26. The voltage drop carries through to the output driver transistor N1. As such, the internal supply voltage is slightly reduced when regulated. For nominal operating voltages, this slight reduction in the internal supply voltage does not adversely affect circuit operation so long as the internal supply voltage remains above a critical level below which circuit operation becomes unpredictable. When the regulated supply voltage drops below the critical level, one or more of the circuits 12-16 may function undesirably. This is particularly true for low voltage operation where the supply voltage powering the circuits 12-16 may be at or near the critical voltage level. Any further drop in the supply voltage may cause circuit failure.

To avoid undesirable circuit behavior during low voltage operation, transistor P1 of the mode selection circuit 20 causes the amplifier stage 26 of the regulator 24 to be bypassed when P1 is enabled. Transistor P1 is enabled when the comparator 22 determines that the external supply voltage provided to the IC 10 is less than (or equal to) the threshold level. When the regulator amplifier 26 is bypassed, the regulated internal supply voltage is supplanted with an unregulated version. As a result, the internal supply voltage is not subjected to the voltage drop associated with the amplifier 26. The low voltage range gained by not regulating the internal supply voltage enables the IC 10 to function properly at low voltages.

The regulator amplifier 26 is bypassed by overriding the variable control signal applied to the gate of transistor N1 with a fixed voltage ($V_{dd}$). Transistor N1 is turned on strongly when its gate is activated by the fixed voltage supplied by transistor P1. Correspondingly, transistor N1 clamps the internal supply voltage to a level approximately equal to the external supply voltage. The internal supply voltage may vary in response to changing current load conditions within the IC 10 since the internal supply voltage is unregulated. However, the internal supply voltage is not subjected to the inherent voltage drop associated with the regulator amplifier 26 when transistor P1 overrides the amplifier output, thus improving circuit performance during low voltage operation.

The voltage regulator 24 may include an optional disabling device such as n-FET transistor N2 for disabling the supply circuit 18. Transistor N2 turns transistor N1 off by pulling N1's gate to ground responsive to an active (high) disable signal (DISABLE) applied to the gate of transistor N2. The voltage supply circuit 18 is disabled when transistor N1 is turned off. The voltage supply circuit 18 may be disabled responsive to various conditions, e.g., when the IC 10 enters low power or sleep mode.

Figure 4:
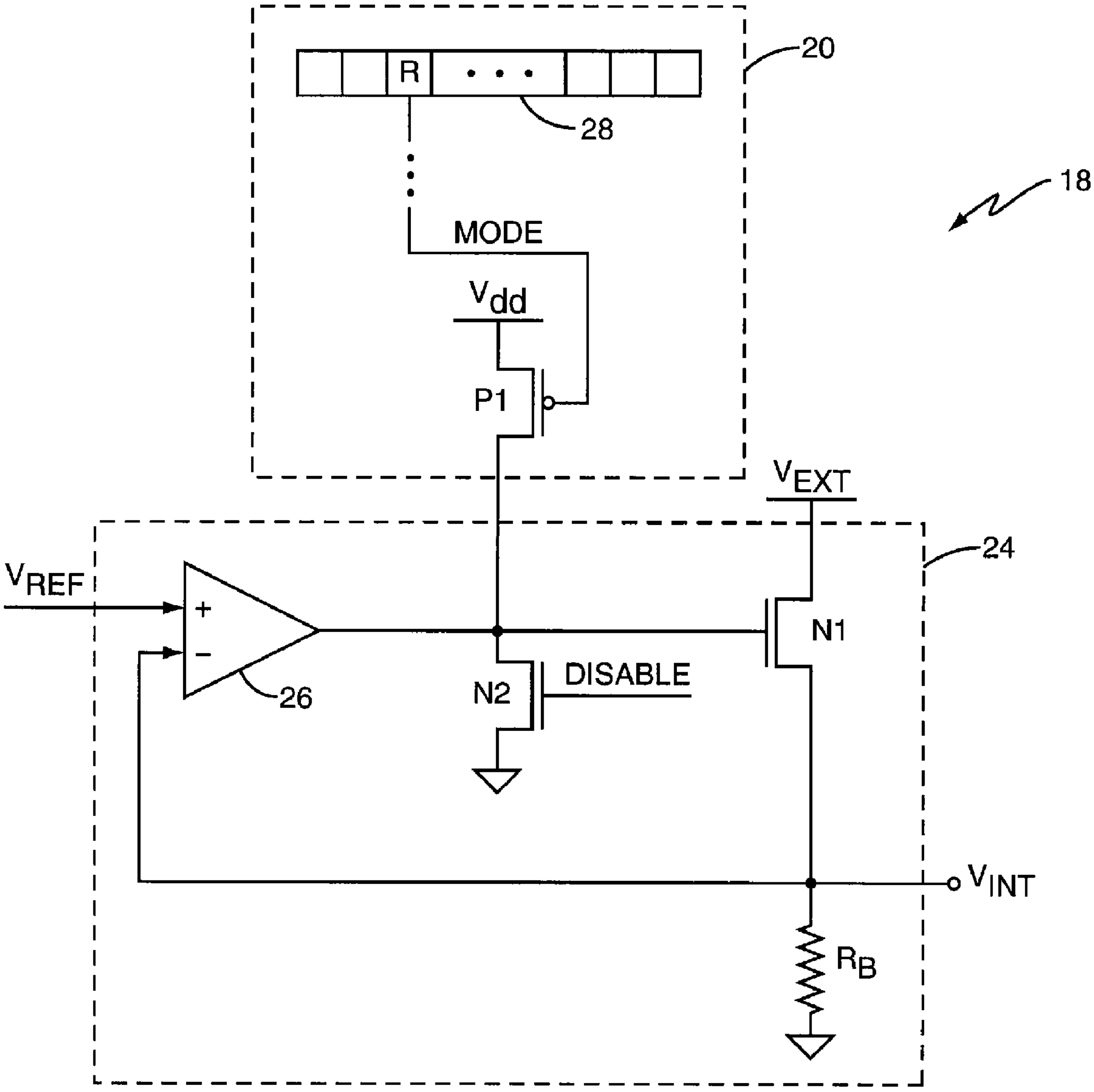
FIG. 4 is a block diagram of another embodiment of the voltage supply circuit of FIG. 1.

FIG. 4 illustrates another embodiment of the voltage supply circuit 18. Unlike the previous embodiment, voltage regulation decisions are not based on the magnitude of the external supply voltage ($V_{EXT}$) provided to the IC 10. Instead, the decision to regulate the internal supply voltage ($V_{INT}$) is based on the state of a mode indicator (MODE) retrieved from a storage device 28 included in or associated with the mode selection circuit 20. The mode indicator may be any type of information that indicates whether the internal supply voltage is to be regulated or not. The storage device 28 need not be physically coupled to the mode selection circuit 20. The storage device 28 may be included in or associated with any one of the logic circuits 12-16 included in the IC 10. Moreover, the storage device 28 may be any kind of device capable of storing the mode indicator such as one or more latches, a register, embedded DRAM, SRAM, a cache, non-volatile memory, etc.

In one embodiment, the IC 10 is a DRAM and the storage device 28 is a DRAM mode register. One or more bits (R) in the DRAM mode register 28 represent the mode indicator. A conventional DRAM mode register may be modified to include one or more additional bits for storing the mode indicator. Alternatively, one or more reserved bits may be used to store the indicator.

Regardless, the mode indicator may be programmed by an application that accesses the IC 10, e.g., via one or more of address, data or control signals (ADDR/DATA/CTRL) provided to the IC 10 as shown in FIG. 1. Thus, voltage regulation decisions may be made on a per-application basis. Alternatively, the mode indicator may be set responsive to a change in an operating condition of the IC 10, e.g., a change in external supply voltage, operating temperature, operating frequency, etc.

Figure 5:
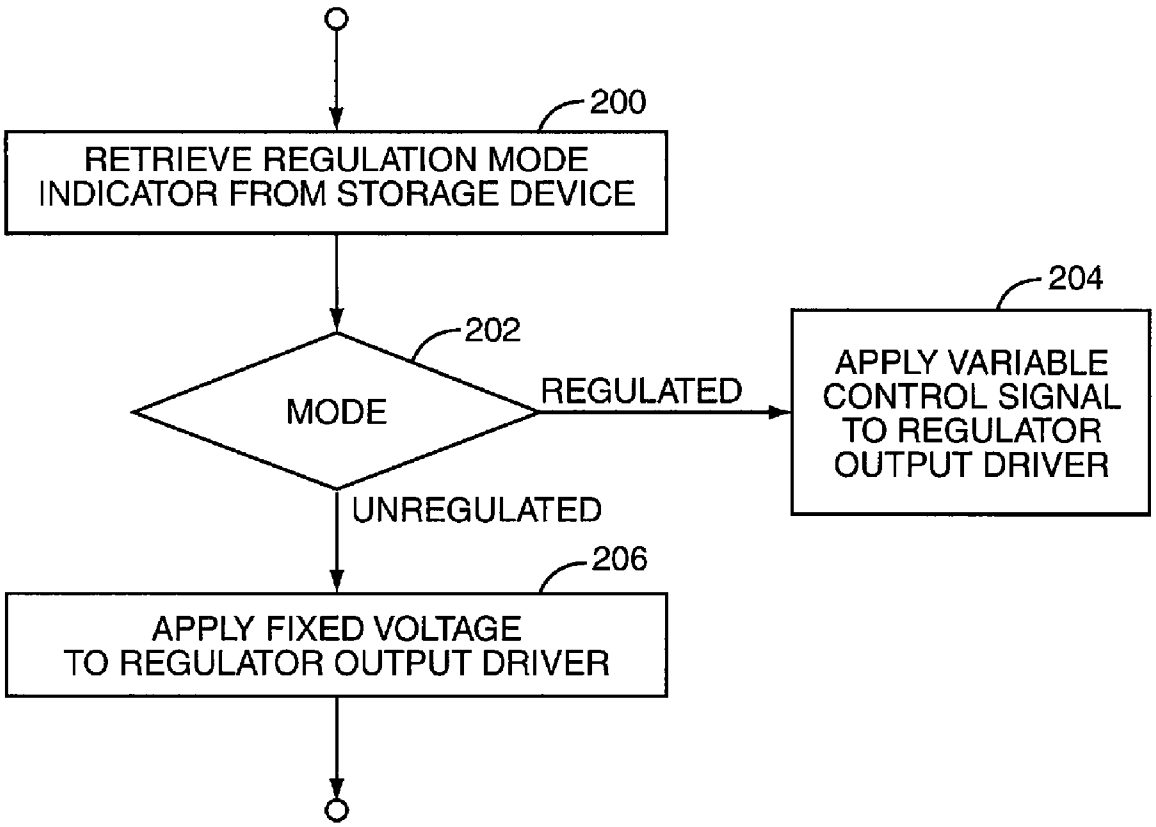
FIG. 5 is a logic flow diagram of another embodiment of program logic for providing an internal supply voltage to circuitry included in the integrated circuit of FIG. 1.

After the mode indicator has been saved by the storage device 28, it may be retrieved and provided to the mode selection circuit 20, as illustrated by Step 200 of FIG. 5. The state of the mode indicator determines whether the internal supply voltage is regulated or not, as illustrated by Step 202 of FIG. 5. If the mode indicator signals voltage regulation, the mode selection circuit 20 enables regulation of the internal supply voltage, as illustrated by Step 204 of FIG. 5. Otherwise, the internal supply voltage is not regulated, as illustrated by Step 206 of FIG. 5.

In more detail, the bypass transistor P1 of the mode selection circuit 20 enables regulation of the internal supply voltage when disabled as previously described. Conversely, transistor P1 bypasses the amplifier stage 26 of the voltage regulator 24 when enabled, thus supplanting the regulated internal supply voltage with an unregulated version also as previously described. The operational state of transistor P1 is controlled by the mode indicator retrieved from the storage device 28. For example, in the DRAM embodiment, the DRAM mode register 28 is accessed and the indicator bit(s) (R) retrieved. If the mode indicator signals regulation, transistor P1 is turned off, thus enabling regulation of the internal supply voltage. Conversely, transistor P1 is turned on when the mode indicator signals low voltage operation.

When transistor P1 is enabled, it overrides the variable control signal applied to the gate of transistor N1 with a fixed voltage ($V_{dd}$) as previously described. Correspondingly, transistor N1 clamps the internal supply voltage to a level approximately equal to the external supply voltage. As such, the internal supply voltage is unregulated, but not subjected to the inherent voltage drop associated with the amplifier stage 26 of the regulator 24. The circuits 12-16 included in the IC 10 operate properly during low voltage operation when powered by the unregulated supply voltage since the supply voltage has improved low voltage range when unregulated.

Figure 6:
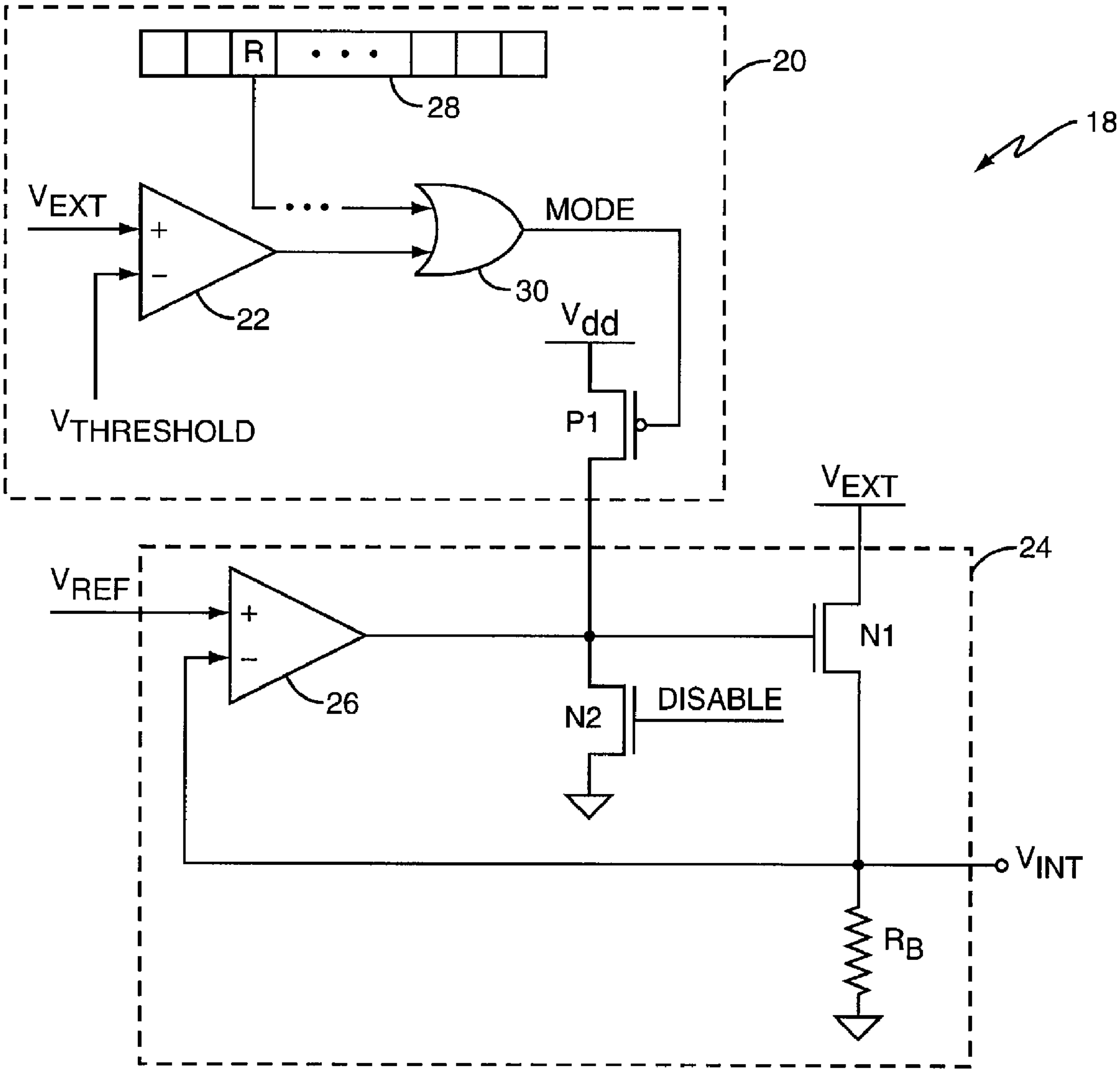
FIG. 6 is a block diagram of yet another embodiment of the voltage supply circuit of FIG. 1.

FIG. 6 illustrates yet another embodiment of the voltage supply circuit 18. According to this embodiment, voltage regulation decisions are made based on either the magnitude of the external supply voltage ($V_{EXT}$) provided to the IC 10 or the state of the mode indicator as retrieved from the storage device 28. The mode selection circuit 20 includes comparator 22 for determining whether the externally provided supply voltage exceeds a threshold ($V_{THRESHOLD}$). The mode selection circuit also receives the mode indicator upon retrieval from the storage device 28. The comparator output and mode indicator are provided to a logic OR gate 30. The output of the OR gate 30 (MODE) enables bypass transistor P1 if either the mode indicator or the comparator output indicates low voltage operation. Otherwise, transistor P1 is disabled. When transistor P1 is enabled, it causes the amplifier stage 26 of the voltage regulator 24 to be bypassed as previously described, thus yielding an unregulated internal supply voltage ($V_{INT}$) having improved low voltage range. Conversely, the supply voltage is regulated when transistor P1 is disabled.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An integrated circuit, comprising:
- a storage device configured to store an indicator; and
- a voltage supply circuit configured to generate a regulated supply voltage for use by the integrated circuit responsive to the indicator indicating normal voltage operation and an unregulated supply voltage responsive to the indicator indicating low voltage operation, wherein the voltage supply circuit includes an amplifier configured to generate a variable control signal for determining the regulated supply voltage, and wherein the voltage supply circuit is configured to bypass the amplifier by overriding the variable control signal to provide the unregulated supply voltage instead of the regulated supply voltage to the integrated circuit responsive to the indicator indicating low voltage operation.

2. The integrated circuit of claim 1, wherein the storage device comprises a register having one or more bits configured to store the indicator.

3. The integrated circuit of claim 2, wherein the integrated circuit comprises a dynamic random access memory device and the register comprises a mode register.

4. The integrated circuit of claim 1, wherein the storage device is configured to modify the indicator responsive to a different computer program accessing the integrated circuit.

5. The integrated circuit of claim 1, wherein the storage device is configured to modify the indicator responsive to a change in an operating condition of the integrated circuit.

6. The integrated circuit of claim 1, wherein the voltage supply circuit comprises a voltage regulator configured to output the regulated supply voltage responsive to the indicator indicating normal voltage operation and supplant the regulated supply voltage with the unregulated supply voltage responsive to the indicator indicating low voltage operation.

7. The integrated circuit of claim 6, wherein the voltage regulator comprises:
- a driver having an input and output, the driver configured to output the regulated supply voltage responsive to the variable control signal being applied to the driver input and output the unregulated supply voltage responsive to the driver input being driven to a fixed voltage level; and
- a device configured to override the variable control signal applied to the driver input with the fixed voltage level responsive to the indicator indicating low voltage operation.

8. The integrated circuit of claim 7, wherein the driver is configured to output the unregulated supply voltage by clamping the driver output to a voltage level corresponding to an external voltage provided to the integrated circuit.

9. The integrated circuit of claim 1, further comprising circuitry configured to compare an external voltage provided to the integrated circuit with a threshold, the voltage supply circuit configured to generate the regulated supply voltage based on the variable control signal responsive to the indicator indicating normal voltage operation or the external voltage exceeding the threshold level and bypass the amplifier by overriding the variable control signal to provide the unregulated supply voltage instead of the regulated supply voltage to the integrated circuit responsive to the indicator indicating low voltage operation or the external voltage falling below the threshold level.

10. In an integrated circuit, a method of providing a supply voltage comprising:

generating a variable control signal as a function of the difference between a reference voltage and the supply voltage provided to the integrated circuit;

retrieving an indicator from a storage device included in the integrated circuit;

generating a regulated supply voltage based on the variable control signal for use by the integrated circuit responsive to the indicator indicating normal voltage operation; and overriding the variable control signal and providing an unregulated supply voltage instead of the regulated supply voltage to the integrated circuit responsive to the indicator indicating low voltage operation.

11. The method of claim 10, wherein retrieving the indicator from the storage device comprises accessing one or more bits in a register.

12. The method of claim 11, wherein accessing one or more bits in the register comprises accessing one or more bits in a mode register included in a dynamic random access memory device.

13. The method of claim 10, further comprising modifying the indicator responsive to a different computer program accessing the integrated circuit.

14. The method of claim 10, further comprising modifying the indicator responsive to a change in an operating condition of the integrated circuit.

15. The method of claim 10, wherein overriding the variable control signal and providing the unregulated supply voltage instead of the regulated supply voltage to the integrated circuit comprises supplanting the regulated supply voltage with the unregulated supply voltage responsive to the indicator indicating low voltage operation.

16. The method of claim 15, wherein supplanting the regulated supply voltage with the unregulated supply voltage comprises:

generating the regulated supply voltage responsive to the variable control signal being applied to an input of a driver; and overriding the variable control signal applied to the driver input with a fixed voltage level responsive to the indicator indicating low voltage operation.

17. The method of claim 16, wherein overriding the variable control signal applied to the driver input with the fixed voltage level comprises clamping an output of the driver to a voltage level corresponding to an external voltage provided to the integrated circuit.

18. The method of claim 10, further comprising:

comparing an external voltage provided to the integrated circuit with a threshold;

generating the regulated supply voltage based on the variable control signal responsive to the indicator indicating normal voltage operation or the external voltage exceeding the threshold level; and overriding the variable control signal and providing the unregulated supply voltage instead of the regulated supply voltage to the integrated circuit responsive to the indicator indicating low voltage operation or the external voltage falling below the threshold level.

19. An integrated circuit, comprising means for generating a supply voltage for use by the integrated circuit, the supply voltage being regulated responsive to a retrieved indicator indicating normal voltage operation and unregulated responsive to the retrieved indicator indicating low voltage operation, wherein the means for generating the supply voltage includes an amplifier configured to generate a variable control signal for determining the regulated supply voltage, and wherein the means for generating the supply voltage is configured to bypass the amplifier by overriding the variable control signal to provide the unregulated supply voltage instead of the regulated supply voltage to the integrated circuit responsive to the indicator indicating low voltage operation.

20. The integrated circuit of claim 19, wherein the means for generating a supply voltage comprises a voltage regulator configured to output the regulated supply voltage responsive to the retrieved indicator indicating normal voltage operation and supplant the regulated supply voltage with the unregulated supply voltage responsive to the retrieved indicator indicating low voltage operation.

21. An integrated circuit, comprising:

circuitry configured to compare an external voltage provided to the integrated circuit with a threshold; and a voltage supply circuit configured to generate a supply voltage for use by the integrated circuit, the supply voltage being regulated responsive to the external voltage exceeding the threshold level and unregulated responsive to the external voltage falling below the threshold level, wherein the voltage supply circuit includes an amplifier configured to generate a variable control signal for determining the regulated supply voltage, and wherein the voltage supply circuit is configured to bypass the amplifier by overriding the variable control signal to provide the unregulated supply voltage instead of the regulated supply voltage to the integrated circuit responsive to the external voltage exceeding the threshold level.

22. The integrated circuit of claim 21, wherein the voltage supply circuit comprises a voltage regulator configured to output the regulated supply voltage responsive to the external voltage exceeding the threshold level and supplant the regulated supply voltage with the unregulated supply voltage responsive to the external voltage falling below the threshold level.

23. The integrated circuit of claim 22, wherein the voltage regulator comprises:

a driver having an input and output, the driver configured to output the regulated supply voltage responsive to the variable control signal being applied to the driver input and output the unregulated supply voltage responsive to the driver input being driven to a fixed voltage level; and a device configured to override the variable control signal applied to the driver input with the fixed voltage level responsive to the external voltage falling below the threshold level.

24. The integrated circuit of claim 23, wherein the driver is configured to output the unregulated supply voltage by clamping the driver output to a voltage level corresponding to the external voltage provided to the integrated circuit.

25. In an integrated circuit, a method of providing a supply voltage comprising:

generating a variable control signal as a function of the difference between a reference voltage and the supply voltage provided to the integrated circuit;

comparing an external voltage provided to the integrated circuit with a threshold;

generating a supply voltage for use by the integrated circuit, the supply voltage being regulated based on the variable control signal responsive to the external voltage exceeding the threshold level and unregulated responsive to the external voltage falling below the threshold level; and overriding the variable control signal and providing the unregulated supply voltage instead of the regulated supply voltage to the integrated circuit responsive to the external voltage falling below the threshold level.

26. The method of claim 25, wherein generating the supply voltage comprises:

generating the regulated supply voltage responsive to the external voltage exceeding the threshold level; and supplanting the regulated supply voltage with the unregulated supply voltage responsive to the external voltage falling below the threshold level.

27. The method of claim 25, wherein generating the supply voltage comprises:

generating the regulated supply voltage responsive to the variable control signal being applied to an input of a driver; and overriding the variable control signal applied to the driver input with a fixed voltage level responsive to the external voltage falling below the threshold level.

28. The method of claim 27, wherein overriding the variable control signal applied to the driver input with a fixed voltage level comprises clamping an output of the driver to a voltage level corresponding to the external voltage provided to the integrated circuit.

* * * * *